Jan. 7, 1964  A. C. WICKMAN  3,116,649
EPICYCLIC POWER TRANSMISSION MECHANISMS
Filed April 24, 1961  2 Sheets-Sheet 1

Jan. 7, 1964     A. C. WICKMAN     3,116,649
EPICYCLIC POWER TRANSMISSION MECHANISMS
Filed April 24, 1961     2 Sheets-Sheet 2

United States Patent Office 3,116,649
Patented Jan. 7, 1964

3,116,649
EPICYCLIC POWER TRANSMISSION
MECHANISMS
Axel C. Wickman, 14 S. Hibiscus Drive, Hibiscus Island,
Miami Beach, Fla.
Filed Apr. 24, 1961, Ser. No. 105,202
Claims priority, application Great Britain May 3, 1960
10 Claims. (Cl. 74—781)

This invention relates to variable speed epicyclic mechanisms for road vehicles or other purposes, of the kind which include control means whereby the sun pinion can be secured either to the housing or to a rotary part of the mechanism.

The object of the invention is to provide the control means in a form which enables smooth transition from one speed ratio to another to be effected in a simple and convenient manner.

A control means in accordance with the invention comprises a friction brake member and a friction clutch member each of which has an axially slidable connection with the sun pinion, said brake member being adapted to be engaged with a complementary brake surface formed on or secured to the housing of the mechanism, and the clutch member being adapted to be engaged with a complementary clutch surface formed on or secured to a rotary part of the mechanism, other than the sun pinion, spring means arranged to act on both of the axially slidable friction members and effect relative movements of these members in one direction, and fluid-pressure operated means for effecting relative axial movements of the said friction members in the opposite direction against said spring means.

Thus the spring means act to provide one drive ratio of the mechanism and the fluid-pressure operated means act to provide an alternative drive ratio.

Figure 1:
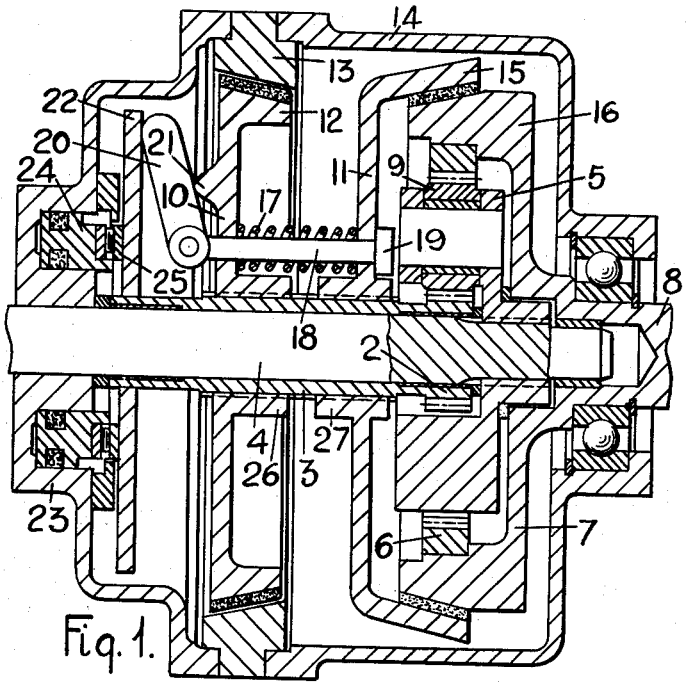
FIGURES 1 and 2 are sectional side elevations respectively illustrating two typical embodiments of the invention as applied to an overdrive mechanism.

In the example of an epicyclic overdrive mechanism illustrated by FIGURE 1, this consists of a sun pinion 2 formed on or secured to a sleeve 3 freely supported on the input shaft 4, a planet pinion carrier 5 secured to the input shaft, an internally toothed annulus 6 formed on or secured to a driven member 7 which is formed on or secured to the output shaft 8, and planet pinions 9 interengaging the sun pinion and annulus.

According to the invention the control means comprises a pair of friction discs 10, 11 which are axially slidable on and have a spline connection with the sleeve 3 of the sun pinion. The brake disc 10 has a peripheral flange 12 of truncated conical form the outer surface of which is adapted for frictional engagement with a complementary brake member 13 presenting a friction brake surface and formed on or secured to the housing 14 of the mechanism. The clutch disc 11 has a peripheral flange 15 of truncated conical form the inner surface of which is adapted for frictional engagement with a complementary clutch member 16 formed on or secured to the annulus 6 and presenting a friction clutch surface.

Between the two discs is placed at least one helically coiled spring 17 which acts on both discs and tends to move them away from each other. Through this spring, and holes in the discs, is inserted a rod 18 having at one end a head 19 which abuts on the disc 11. To the other end of the rod is pivotally attached a lever 20 which at a position between its ends abuts on a fulcrum 21 formed on or attached to one side of the disc 10. The free end of the lever abuts against an actuating disc 22 which is freely slidable on the sun pinion sleeve 3. In a portion of the housing adjacent to this latter disc is formed an annular hydraulic cylinder 23 in which is contained an annular piston 24, the latter being adapted to impart movement to the said disc through a thrust ring 25. If desired two or more springs, rods and levers may be provided in combination with the brake and clutch discs at equiangular distances apart.

The arrangement is such that when the hydraulic piston 24 is in its innermost position, where it serves as a stop for the associated lever-actuating disc 22, the spring or springs 17 acting on the brake and clutch discs cause the clutch disc 11 to be frictionally engaged with the clutch 16 associated with the annulus 6 of the epicyclic mechanism, so interlocking the sun pinion and annulus, and thereby causing the output shaft to be driven at the same speed as the input shaft. In this condition the spring or springs hold the brake disc 10 out of contact with the brake member 13 in the housing.

When the overdrive condition is required, the piston is energised. This has the effect of moving the associated lever-actuating disc 22 and thereby causing the lever 20 (or levers) to move the adjacent brake disc 10 towards the fixed brake member 13 in the housing. Meanwhile the other clutch disc 11 remains in engagement with the clutch part 16 under the reaction force exerted by the spring or springs until the brake member 13 in the housing is fully engaged. Thereafter the continued action of the piston separates the other clutch disc 11 from the clutch part 16 against the action of the spring or springs 17. In this condition the output shaft is driven at a higher rate than the input shaft.

To limit the extent to which the spring or springs 17 can be compressed by the piston, bosses 26, 27 may be formed on the adjacent sides of the discs 10, 11 and arranged to effect mutual contact after a given moment has been imparted to the discs.

From the above description it will be apparent that the change from either speed ratio to the other is effected without intermission, and consequently a smooth transition is ensured. Moreover the action is independent of any adventitious condition such as for example, the viscosity of the oil usually employed for actuating the piston.

Figure 2:
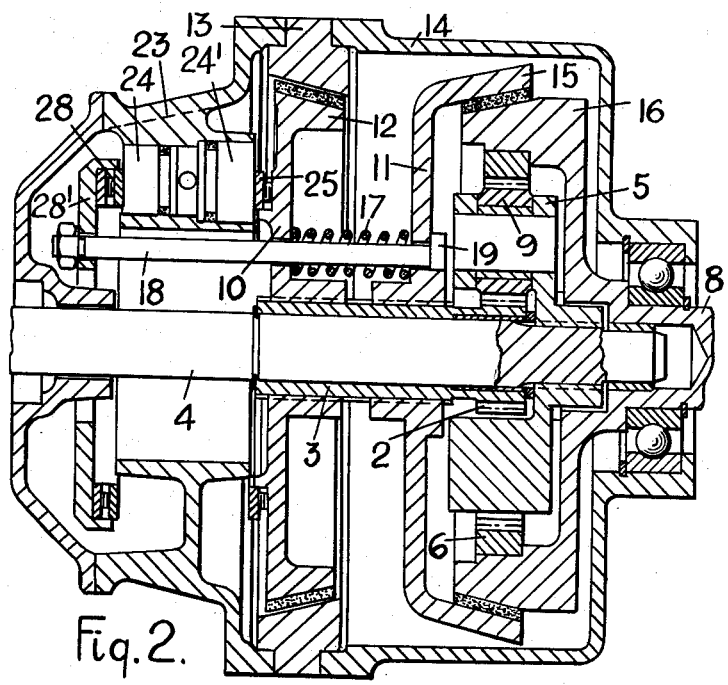

In the alternative arrangement illustrated by FIGURE 2 the annular cylinder 23 is open at both ends, and in it are contained two pistons 24 and $24^1$, the piston $24^1$ having a larger diameter than the piston 24 and the motive liquid being admitted to the cylinder at a position between the inner ends of the pistons. In this case the outer end of the piston $24^1$ acts through a thrust ring 25 on the adjacent brake disc 10. The other piston 24 serves to actuate the clutch disc 11, and effects movement of this disc by acting through a thrust ring 28 on an abutment $28^1$ secured to one end of the spring-carrying rod or rods 18 which pass through the discs 10, 11. When the motive liquid is introduced between the pistons 24 and $24^1$, the latter (being the larger) will move first so that part 15 will remain in engagement with the annulus until the part 12 engages the fixed brake member. The piston 24 will then move to disengage said part 15 from said annulus.

Figure 3:
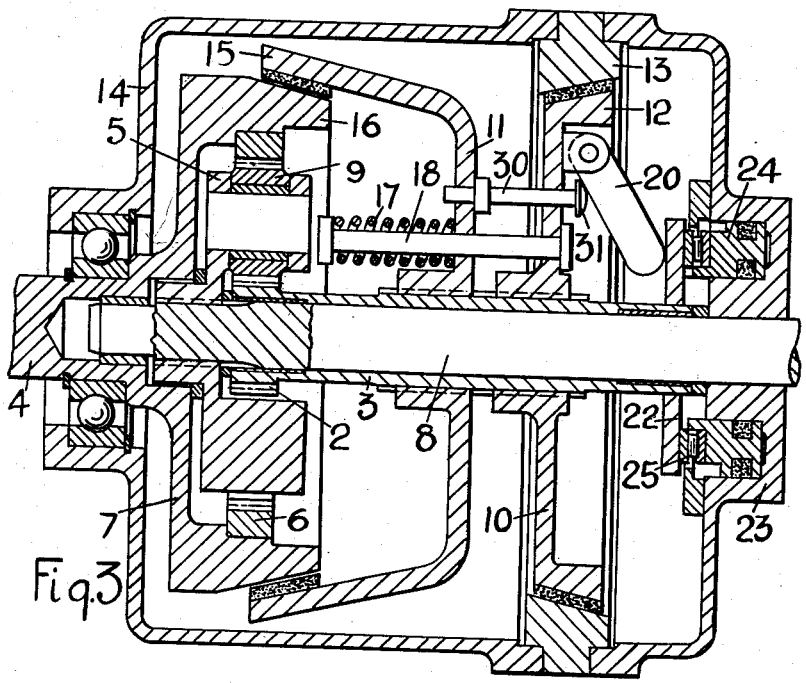

The invention is applicable in an essentially similar manner to an underdrive mechanism. In the example illustrated by FIGURE 3 (which is essentially similar to the arrangement shown in FIGURE 1) the sun pinion sleeve 3 is carried by the output shaft 8 and the planet pinion carried 5 is secured to the output shaft, the internally toothed annulus 6 being formed on a member 7 secured to or formed on the input shaft 4. The spring-carrying rod 18 (or rods) above mentioned passes through both discs 10, 11 and is headed at each end, the spring 17 being mounted on the rod at a position between one of the said heads and the clutch disc 11 which co-operates with the annulus, and having the effect of moving the discs towards each other. The fulcrum with which the piston-actuated lever 20 (or levers) co-operates consists of a rod 30 which is secured at one end to the clutch disc 11 which co-operates with the annulus and passes through a hole in the brake disc 10 which co-operates with the brake member 13 in the housing. The lever is pivoted on this other disc 10 and abuts against a head 31 on the projecting end of the fulcrum rod 30.

The arrangement is such that when the piston 24 is idle, the spring 17 (or springs) effects engagement of the brake disc 10 with the housing and so holds the sun pinion against rotation, the other clutch disc 11 being then free from the clutch part 12. The output shaft is then driven at a lower speed than the input shaft. When it is required that the shafts shall rotate at the same speed the piston 24 is energised. The effect of this is to move the clutch disc 11 towards the clutch part 12. Meanwhile the brake disc 10 remains in contact with the brake member 13 on the housing until the disc 11 is fully engaged with the clutch member 16. Continued action of the piston then disengages the brake disc 10 from the brake member 13. In this condition the sun pinion and annulus are interlocked and both shafts then rotate at the same speed.

Figure 4:
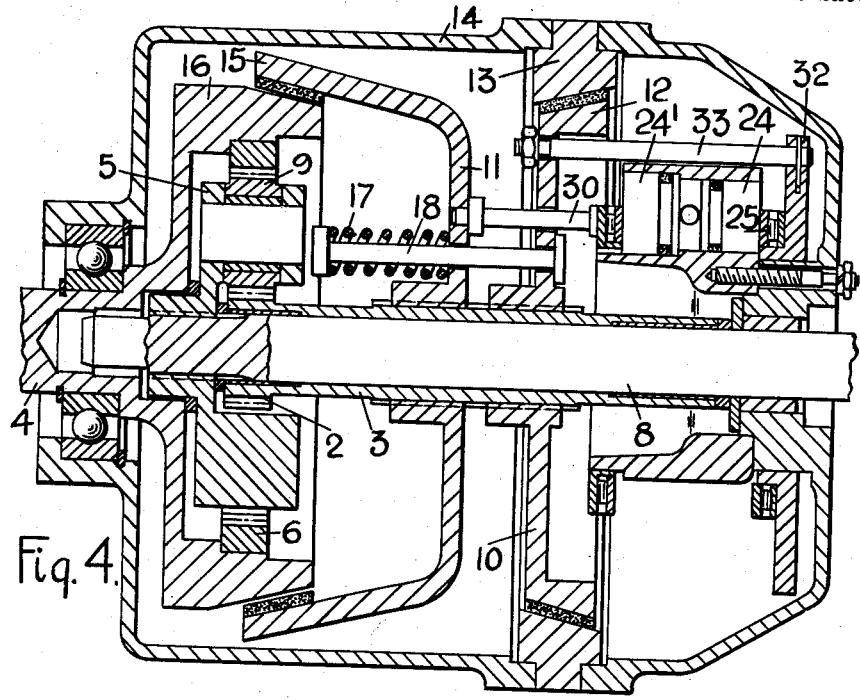
FIGURES 3 and 4 are sectional side elevations respectively illustrating two typical embodiments of the invention as applied to an underdrive mechanism.

In the alternative form of underdrive mechanism illustrated by FIGURE 4 the hydraulic means employed for actuating the clutch discs is essentially similar to that shown in FIGURE 2. The mode of action is as follows:

When the pistons 24, 24¹ are energised the piston 24¹ (being the larger) moves first the clutch disc 11 for inter-engaging the clutch parts 15, 16 so causing the annulus 6 and sun pinion 2 to be interlocked. The shafts 4, 8 are then driven at the same speed. At the same time the piston 24 acting through the thrust ring 25 disc 32 and rod (or rods) 33 disengages the brake parts 12, 13. When the pistons are inoperative, the brake parts 12, 13 are mutually engaged, and the parts 15, 16 disengaged, by the spring (or springs) 17, so causing the shaft 8 to be driven at a lower speed than the shaft 4.

The invention is not, however, restricted to use with the particular forms of epicyclic mechanism above described, as it may be employed in essentially the same manner to other forms of epicyclic mechanism for vehicles or other purposes.

Having thus described my invention what I claim as new and desire to secure by Letters Patent is:

1. In a variable speed epicyclic gear mechanism comprising a housing and rotary parts in said housing in the form of a sun pinion, an internally toothed annulus, and at least one planet pinion meshing with said sun pinion and said annulus; control means for alternatively braking said sun pinion relatively to said housing or securing said sun pinion to another of said rotary parts to provide alternative drive ratios of the mechanism, comprising an axially slidable friction brake member rotatably coupled to said sun pinion, a complementary fixed brake member arranged for frictional braking engagement with said slidable brake member, a friction clutch member axially slidable relatively to both said slidable brake member and said sun pinion to the latter of which it is rotatably coupled, a complementary clutch member secured to said another rotary part and arranged for frictional engagement with said slidable clutch member, spring means acting on said slidable brake and clutch members to urge one of those members into frictional engagement with the corresponding complementary friction member and the other away from such engagement to provide one of said alternative drive ratios, and fluid-pressure operated means for simultaneously moving said slidable friction members against the action of said spring means whereby to provide the other of said alternative drive ratios.

2. In a variable speed epicyclic gear mechanism comprising a housing and, within said housing, a sun pinion an internally toothed annulus, and at least one planet pinion meshing with said sun pinion and said annulus; control means for alternatively braking said sun pinion relatively to said housing or securing said sun pinion relatively to said annulus to provide alternative drive ratios of the mechanism, comprising an axially slidable friction brake member rotatably coupled to said sun pinion, a complementary fixed brake member arranged for frictional braking engagement with said slidable brake member, a friction clutch member axially slidable relatively to both said slidable brake member and said sun pinion to the latter of which it is rotatably coupled, a complementary clutch member fixed to said annulus and arranged for frictional engagement with said slidable clutch member, spring means acting on said slidable brake and clutch members to urge one of those members into frictional engagement with the corresponding complementary friction member and the other away from such engagement to provide one of said alternative drive ratios, and fluid-pressure operated means for simultaneously moving said slidable friction members against the action of said spring means whereby to provide the other of said alternative drive ratios.

3. In a variable speed epicyclic gear mechanism comprising a housing and rotary parts in said housing in the form of a sun pinion, an internally toothed annulus, and at least one planet pinion meshing with said sun pinion and said annulus; control means for alternatively braking said sun pinion relatively to said housing or securing said sun pinion to another of said rotary parts to provide alternative drive ratios of the mechanism, comprising a friction brake member rotatably coupled to said sun pinion and axially slidable for frictional braking engagement with a complementary braking surface rotatably fixed relatively to said housing, a friction clutch member axially slidable relatively to both said slidable brake member and said sun pinion to the latter of which it is rotatably coupled, axial sliding movement of said clutch member providing frictional engagement with a complementary clutch surface rotatably fixed relatively to said another rotary part, spring means acting on said slidable brake and clutch members to urge one of those members into frictional engagement with the corresponding complementary surface and the other away from such engagement to provide one of said alternative drive ratios, and fluid-pressure operated means for moving said slidable friction members against the action of said spring means whereby to provide the other of said alternative drive ratios.

4. In a variable speed epicyclic gear mechanism comprising a housing and rotary parts in said housing in the form of a sun pinion, an internally toothed annulus, and at least one planet pinion meshing with said sun pinion and said annulus; control means for alternatively braking said sun pinion relatively to said housing or securing said sun pinion to another of said rotary parts to provide drive ratios of the mechanism, comprising an axially slidable friction brake member rotatably coupled to said sun pinion, a complementary fixed brake member arranged for frictional braking engagement with said slidable brake member, a friction clutch member axially slidable relatively to both said slidable brake member and said sun pinion to the latter of which it is rotatably coupled, a complementary clutch member secured to said another rotary part and arranged for frictional engagement with said slidable clutch member, a series of rods which engage one of said slidable members and pass freely through the other of said slidable members, a series of springs respectively mounted in compression on said rods on the side of said other slidable member remote from said one slidable member and acting on said rods and said other slidable member to urge one of said slidable members into frictional engagement with the corresponding complementary friction member and the other away from such engagement to provide one of said alternative drive ratios, and fluid-pressure operated means for moving said slidable friction members against the action of said spring means whereby to provide the other of said alternative drive ratios.

5. A variable speed epicyclic gear mechanism comprising a housing: rotary parts in said housing in the form of a sun pinion, an internally toothed annulus, and at least one planet pinion meshing with said sun pinion and said annulus; and control means for alternatively braking said sun pinion relatively to said housing or securing said sun pinion to another of said rotary parts to provide alternative drive ratios of the mechanism, comprising a friction brake member rotatably coupled to said sun pinion and axially slidable relatively thereto for frictional braking engagement with a complementary brake surface rotatably fixed relatively to said housing, a friction clutch member also rotatably coupled to said sun pinion and arranged for axial sliding movement relatively to both said slidable brake member and said sun pinion for frictional engagement with a complementary clutch surface rotatably fixed relatively to said another rotary part, spring means acting on both said slidable brake and clutch members to urge one of those members into frictional engagement with the corresponding complementary surface and the other away from such engagement to provide one of said alternative drive ratios, a fluid-pressure operated piston, a cylinder in which said piston slides, and a lever mechanism interposed between said piston and said slidable friction members and operable so that application of fluid pressure to said piston acts through said lever mechanism to move said slidable friction members against the action of said spring means whereby to provide the other of said alternative drive ratios.

6. A gear mechanism according to claim 5, wherein said complementary friction surfaces are of generally frusto-conical form.

7. A variable speed epicyclic gear mechanism comprising a housing; rotary parts in said housing in the form of a sun pinion, an externally toothed annulus, and at least one planet pinion meshing with said sun pinion and said annulus; and control means for alternative braking said sun pinion relatively to said housing or securing said sun pinion to another of said rotary parts to provide alternative drive ratios of the mechanism, comprising a friction brake member rotatably coupled to said sun pinion and axially slidable relatively thereto for frictional braking engagement with a complementary brake surface rotatably fixed relatively to said housing, a friction clutch member also rotatably coupled to said sun pinion and arranged for axial sliding movement relatively to both said slidable brake member and said sun pinion for frictional engagement with a complementary clutch surface rotatably fixed relatively to said another rotary part, spring means acting on both said slidable brake and clutch members to urge one of those members into frictional engagement with the corresponding complementary surface and the other away from such engagement to provide one of said alternative drive ratios, two fluid-pressure operated pistons, a common cylinder in which said pistons are slidably mounted, means for introducing fluid pressure into such cylinder between said pistons, and force transmitting means disposed between said pistons and said slidable friction members whereby under the influence of fluid pressure said pistons respectively act to and said slidable friction members whereby under the of said spring means to provide the other of said alternative drive ratios.

8. A gear mechanism according to claim 7, wherein said force-transmitting means comprise a thrust bearing through which one of said pistons acts directly on the adjacent slidable friction member, and at least one force transmitting rod which engages the other slidable friction member and passes freely through said one slidable member, and through which the other of said pistons acts indirectly on said other of said slidable friction members.

9. A gear mechanism according to claim 8, wherein said pistons are of annular form and said other piston acts on said other slidable friction member through a series of said force transmitting rods, said spring means comprising a plurality of compression springs mounted on said rods.

10. A gear mechanism according to claim 7, wherein said pistons are of different effective cross-sectional area and the piston of larger effective area is associated with the slidable friction member which is urged away from frictional engagement by said spring means.

References Cited in the file of this patent

UNITED STATES PATENTS

| | | |
|---|---|---|
| 2,115,964 | Osborne | May 3, 1938 |
| 2,136,971 | Fleischel | Nov. 15, 1938 |
| 2,203,296 | Fleischel | June 4, 1940 |
| 2,399,097 | Carnagua | Apr. 23, 1946 |
| 2,507,050 | Roberts | May 9, 1950 |
| 2,578,308 | Iavelli | Dec. 11, 1951 |
| 2,654,269 | Wilson | Oct. 6, 1953 |
| 2,939,558 | Schjolin | June 7, 1960 |

FOREIGN PATENTS

| | | |
|---|---|---|
| 687,406 | France | Apr. 28, 1930 |